United States Patent [19]

Yoda et al.

[11] Patent Number: 5,027,339

[45] Date of Patent: Jun. 25, 1991

[54] OPTICAL CARD ANALYZING APPARATUS

[75] Inventors: Shigeru Yoda, Mishima; Kouji Nitto, Takatsuki, both of Japan

[73] Assignee: Omron Tateisi Electronics Company, Kyoto, Japan

[21] Appl. No.: 227,336

[22] Filed: Aug. 2, 1988

[30] Foreign Application Priority Data

Aug. 6, 1987 [JP] Japan .................................. 62-196747
Oct. 28, 1987 [JP] Japan .................................. 62-165026

[51] Int. Cl.$^5$ ................................................. G11B 7/00
[52] U.S. Cl. ........................................ 369/54; 369/58
[58] Field of Search ....................... 369/53, 54, 58, 59, 369/111, 279

[56] References Cited

U.S. PATENT DOCUMENTS

| | | | |
|---|---|---|---|
| 4,727,531 | 2/1988 | Ito et al. ............................. | 369/54 X |
| 4,787,075 | 11/1988 | Matsuoka et al. .................. | 369/279 X |
| 4,870,633 | 9/1989 | Matsushita et al. ............... | 369/59 X |
| 4,872,154 | 10/1989 | Sakagami et al. .................. | 369/54 |

FOREIGN PATENT DOCUMENTS

| | | |
|---|---|---|
| 0083475 | 7/1983 | European Pat. Off. . |
| 0159785 | 10/1985 | European Pat. Off. . |
| 2174530 | 11/1986 | United Kingdom . |
| WO-8802169 | 3/1988 | World Int. Prop. O. . |

OTHER PUBLICATIONS

Patent Abstracts of Japan, vol. 4; No. 103 (P-020) July 23, 1980; JP-A-55 062533 (Matsushita Electric Ind. Co. Ltd.) May 12, 1980.
Patent Abstracts of Japan, vol. 9; No. 190 (P-378) (1913) Aug. 7, 1985; JP-A-60 059539 (Matsushita Denki Sangyo K.K.) Apr. 5, 1985.

*Primary Examiner*—Robert L. Richardson
*Attorney, Agent, or Firm*—Dickstein, Shapiro & Morin

[57] ABSTRACT

There is provided an optical card information recording/playing back apparatus comprising: an optical system for irradiating a light beam for reproducing recorded information onto information recording tracks of the optical card on which pit trains indicative of recording information are formed; a photo detector for receiving the reflected light from the optical card and outputting a photo sensing signal; a pit correspondence signal producing circuit for detecting a peak of the photo sensing signal and producing a pit correspondence signal which changes in correspondence to a pit position on the basis of the result of the peak detection; a frequency/voltage converter for converting a frequency of the pit correspondence signal to a voltage; and a discrimination signal producing circuit for comparing a voltage output of the frequency/voltage converter with a reference value and producing an information presence/absence discrimination signal.

14 Claims, 10 Drawing Sheets

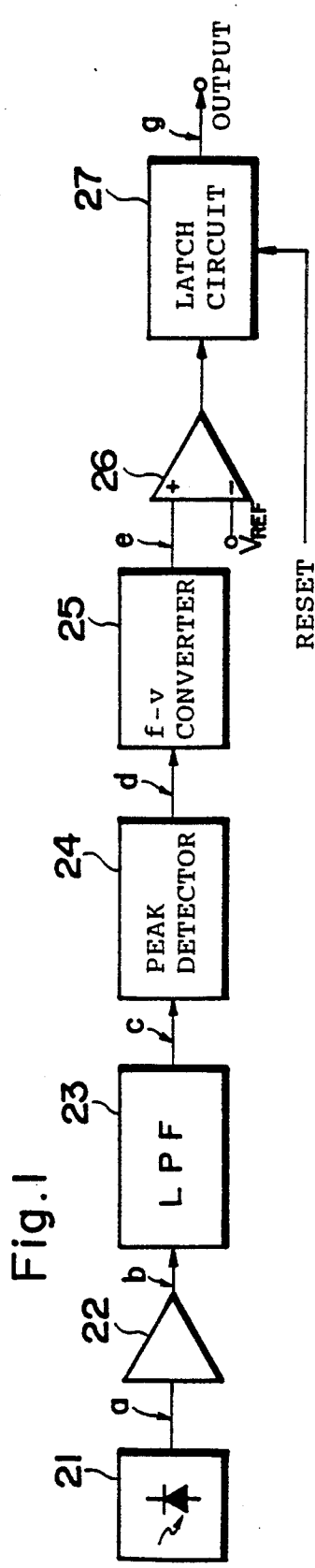
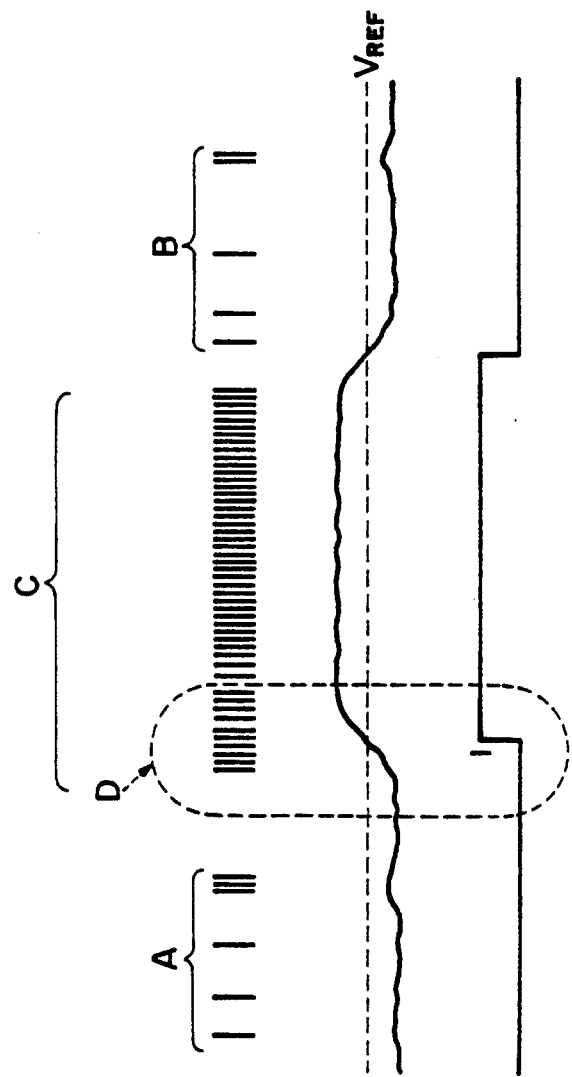

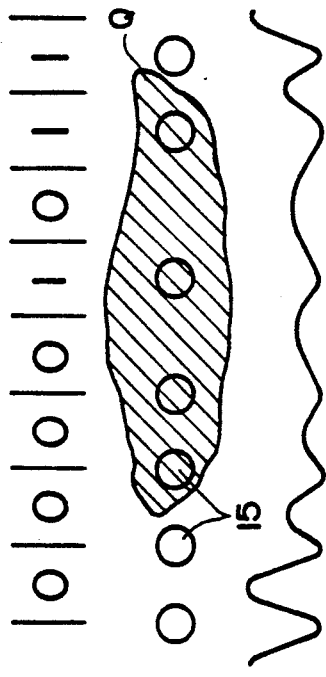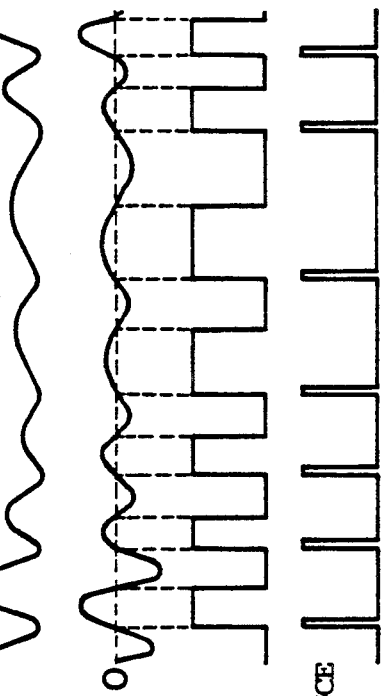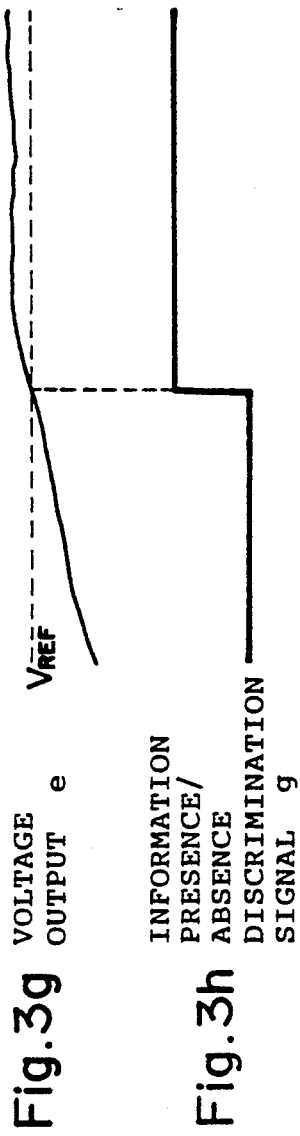
Fig. 3a INFORMATION
Fig. 3b PIT TRAIN
Fig. 3c PHOTO SENSING SIGNAL a (b)
Fig. 3d ZERO-CROSS SIGNAL $c_1$
Fig. 3e BINARIZATION SIGNAL $c_2$
Fig. 3f PIT CORRESPONDENCE SIGNAL d
Fig. 3g VOLTAGE OUTPUT e
Fig. 3h INFORMATION PRESENCE/ABSENCE DISCRIMINATION SIGNAL g

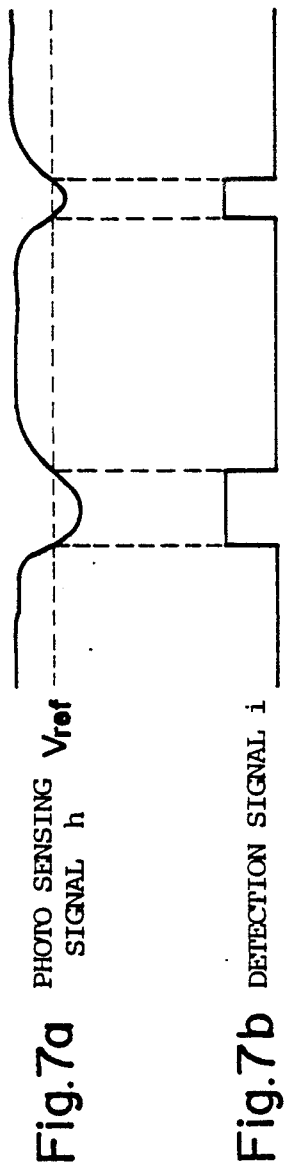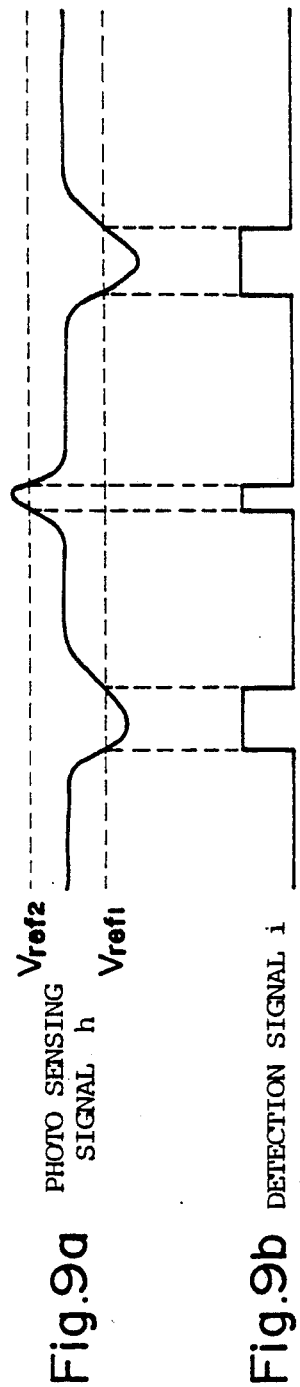

Fig.14a PITS 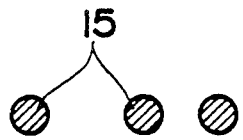
Fig.14b PHOTO SENSING SIGNAL 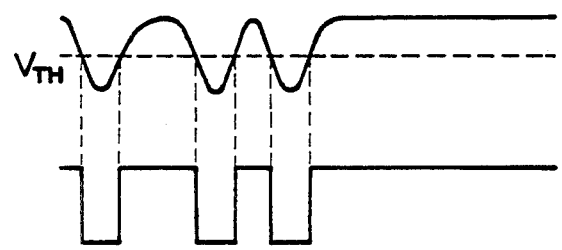
Fig.14c BINARY DATA
Fig.15a PITS 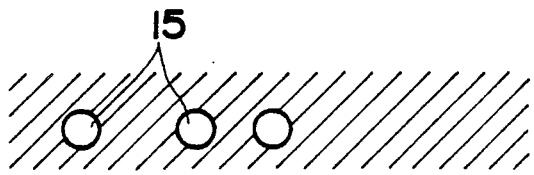
Fig.15b PHOTO SENSING SIGNAL 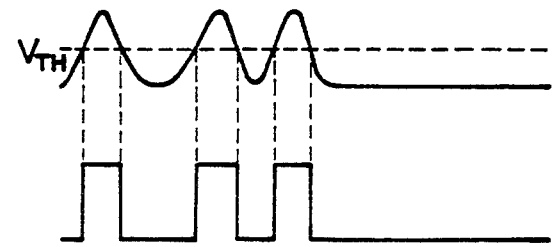
Fig.15c BINARY DATA Fig.16a FOULING
Fig.16b PHOTO SENSING SIGNAL 
Fig.16c BINARY DATA 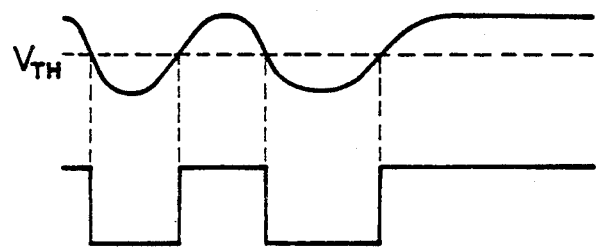
Fig.17a FOULING 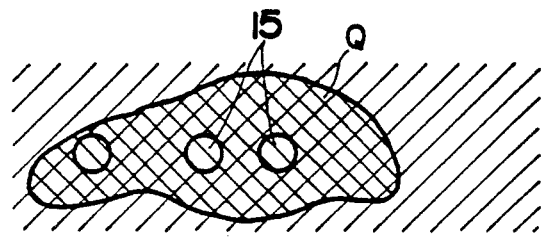
Fig.17b PHOTO SENSING SIGNAL 
Fig.17c BINARY DATA 

OPTICAL CARD ANALYZING APPARATUS

BACKGROUND OF THE INVENTION

1. Field of the Invention

The present invention relates to an apparatus for playing back recorded information from an optical card which is used to read out (play back) information recorded on a card-shaped information recording medium (hereinafter, referred to as an "optical card").

The invention also relates to an optical card recording apparatus which is used to record information onto an optical card and, more particularly, to an optical card recording apparatus having a discriminating function to see if a defect such as a scratch or the like exists on information recording tracks of the optical card or not.

2. Prior Art Statement

In an optical system of a conventional optical card information playing back (reproducing) apparatus, as shown in FIG. 12, a light beam for reproducing recorded information is projected from a light source 1 for light projection such as laser, light emitting diode or the like. This light beam is converted into the parallel light beam by a collimator lens 2. The light beam is then converged by a condenser lens 3, thereby forming a light spot 6 onto an information recording portion 5 (refer to FIG. 13) on an optical card 4. The reflected light of the light spot 6 from the information recording portion 5 passes through the condenser lens 3, a reflecting mirror 7, an image forming lens 8 and the like and is finally received by a photo detector 9 consisting of a photo diode. Thus, a signal indicative of the information recorded on the optical card 4 is reproduced.

The information recording portion 5 on the optical card 4 is constructed by forming an information recording layer 11 on a substrate 10 and by further forming a transparent protective layer 12 on the information recording layer 11. As shown in FIG. 13, on the information recording layer 11, a number of pits 15 indicative of recording information are respectively formed in a line on each of a number of information recording tracks 14 formed along track guides 13. The track guides 13 are formed for controlling an optical head so as to trace the information recording tracks in the recording or reproducing mode (that is, they are provided for a tracking control).

A reflectance of pits 15 differs from reflectance of the other portion. As shown in FIG. 14a, in the case of an optical card in which the reflectance of the pits 15 is lower than that of the other portion, the level of the photo sensing signal from the photo detector 9 decreases in the portions of the pits 15 (FIG. 14b). By binarizing the photo sensing signal level on the basis of a threshold value $V_{TH}$, binary data as shown in FIG. 14c is derived.

In the case of an optical card in which the reflectance of the pits 15 is higher than that of the other portion as shown in FIG. 15a, the level of the photo sensing signal from the photo detector 9 increases in the portions of the pits 15 (FIG. 15b). By binarizing the photo sensing signal level on the basis of the threshold value $V_{TH}$, binary data as shown in FIG. 15c is derived.

When information is recorded onto the information recording tracks 15 of the optical card 4, the presence or absence of recorded information needs to be checked by previously scanning the information recording tracks 14 so that information is not overlappingly written at the same position. This checking process is performed by irradiating a light beam for reproducing the recorded information onto the information recording track 14 to be checked and by scanning this track. According to a recording method shown in FIG. 14a, the number of times when the level of the photo sensing signal is lower than the threshold value $V_{TH}$ is counted by the binary data. On the other hand, according to a recording method shown in FIG. 15a, the number of times when the level of the photo sensing signal exceeds the threshold value $V_{TH}$ is counted by the binary data. When each of the count values is 1 or more, it is determined that information is recorded on the information recording track 14.

However, the optical card 4 is not always in the proper ideal state and there is a case where defects such as scratches, fouling or the like exist on the information recording tracks 14. When such defects exist, although no recorded information exists, a misjudgement such that "the recorded information exists" is made, or in spite of the presence of the recorded information, a misjudgement such that "there is no recorded information" is made.

FIG. 16a shows a state in which in the recording method of FIG. 14a in the case where the reflectance of the pits is set to be lower than that of the other portion, a fouling Q is deposited on the portion where no recorded information exists on the surface of the optical card 4. In this case, the level of the photo sensing signal decreases in the portion of the fouling Q (FIG. 16b). When this level is binarized on the basis of the threshold value $V_{TH}$, the binary data similar to that in the case where the recorded information exists is derived as shown in FIG. 16c.

On the contrary, FIG. 17a shows a state in which in the recording method of FIG. 15a in the case where the reflectance of the pits 15 is set to be higher than that of the other portion, a fouling Q is deposited on the portion where recorded information (pits 15) exists. In this case, the level of the photo sensing signal does not sufficiently rises in the portion of the fouling Q (FIG. 17b). When this level is binarized on the basis of the threshold value $V_{TH}$, the binary data similar to that in the case where no recorded information exists is derived as shown in FIG. 17c (in other words, the signal level is always at the low level).

As mentioned above, in spite of the absence of the recorded information, if it is decided that the recorded information existed, this information recording track cannot be used any more, so that this causes a recording capacity to be reduced. On the contrary, in spite of the presence of the recorded information, if it is determined that no recorded information existed, information is overlappingly recorded on this information recording track, so that a defective recording of the information is performed.

The foregoing system detects only the presence or absence of the recorded information but does not actively detect defects due to scratches, deposited matters or the like on the surface of the optical card.

In the optical card 4 with the construction shown in FIG. 13, when defects due to scratches, deposited matters or the like exist in the information recording portion 5, after information was written onto the information recording tracks 14, even if this recorded information is played back, it is difficult to obtain the proper reproduced information.

Therefore, hitherto, when the optical card 4 is manufactured, an inspector checks the presence or absence of defects such as scratches or the like by observing the surface of the information recording portion 5 by the eyes, or the presence or absence of defects or an amount of defects is examined by scanning each of the information recording tracks 14 of the optical card 4 by using an optical head.

However, according to the former checking method by the observation using the eyes, the inspecting precision is low and it is difficult to detect such microdefects that can be hardly checked by the eyes. On the other hand, according to the latter detecting method, since it takes a long time to check one optical card, the manufacturing cost of the optical card increases. In any of these methods, moreover, it is impossible to cope with defects which may occur after the optical card was shipped.

SUMMARY OF THE INVENTION

It is an object of the present invention to provide a novel apparatus for playing back recorded information from an optical card in which the presence or absence of recorded information on information recording tracks can be certainly and accurately discriminated, thereby preventing the occurrence of a defective recording of information and improving the using efficiency of the information recording tracks.

Another object of the invention is to provide a novel optical card recording apparatus in which while information is being written onto a certain information recording track of an optical card, by checking the presence or absence of defects on the information recording track onto which the information is subsequently written, the manufacturing cost of the optical card can be reduced and it is also possible to cope with defects which may occur after the optical card was shipped.

According to the present invention, there is provided an apparatus for playing back recorded information from an optical card in which by irradiating a light beam for reproducing the recorded information onto information recording tracks of the optical card on which pit trains indicative of recording information are formed, the pit trains are read on the basis of the difference between the reflectance of the pit portion and of the other portion and the recorded information on the optial card is reproduced, wherein this apparatus comprises: photo detecting means for receiving a reflected light from the optical card and outputting a photo sensing signal; pit correspondence signal producing means for detecting the peak of the photo sensing signal and producing a pit correspondence signal which changes in correspondence to the pit position on the basis of the result of the peak detection; frequency/voltage converting means for converting a frequency of the pit correspondence signal into a voltage; and discrimination signal producing means for comparing a voltage output of the frequencY/voltage converting means with a reference value and producing an information presence/absence discrimination signal.

Prior to recording information onto the optical card, a light beam for reproducing recorded information is irradiated onto the information recording track onto which the information is to be recorded and this track is scanned, thereby checking the presence or absence of recorded information. In this case, the reflected light from the optical card is received by the photo detecting means and a photo sensing signal is output. The peak of the photo sensing signal is detected by the pit correspondence signal producing means. The pit (peak) correspondence signal which changes in correspondence to the pit position (peak detection position) is produced on the basis of the result of the peak detection. Further, the frequency/voltage converting means converts the frequency of the pit correspondence signal into the voltage. The voltage output of the frequency/voltage converting means is compared with a reference value by the discrimination signal producing means, so that an information presence/absence discrimination signal is produced.

Even if a fouling or the like exists in the portion having no recorded information, the frequency/voltage conversion output based on the photo sensing signal in this portion does not reach the reference value which is used in the discrimination signal producing means, so that the information presence/absence discrimination signal is turned off (i.e., it is set to the low level) and "no recorded information exists" is properly determined. On the other hand, even if a fouling or the like exists in the portion having recorded information and an amount of reflected light changes, the peak of the photo sensing signal is detected and a pit correspondence signal is produced, so that the information presence/absence discrimination signal is turned on (namely, it is set to the high level) and "the recorded information exists" is properly decided.

According to the present invention, there is provided an optical card recording and playing back apparatus comprising: a first optical system for irradiating a light onto information recording tracks for recording of an optical card and for writing information; and a second optical system for irradiating a light onto the information recording track for reproducing of the optical card and for reading the recorded information on the basis of the reflected light, wherein the second optical system has a light receiving portion which can individually receive the reflected lights from a plurality of information recording tracks, and a defect discriminating section is connected to the light receiving portion, and when information is recorded onto a certain information recording track, the presence or absence of a defect on the information recording track onto which information is to be recorded after that is discriminated by the defect discriminating section on the basis of the photo sensing signal of the light receiving portion.

When a light is irradiated onto a predetermined information recording track of the optical card and information is written onto this track by the first optical system, the second optical system is also made operative, thereby irradiating a light onto the information recording track onto which the information is to be written after that. The reflected light from the information recording track to be written thereafter is input to the light receiving portion through the second optical system. The defect discriminating section discriminates whether a defect exists or not on this information recording track on the basis of the photo sensing signal of the light receiving portion. In this manner, the presence or absence of a defect on the information recording track to be written next is checked in parallel with the writing of the information. Thus, the load of the check upon manufacturing of the optical card is lightened, the manufacturing cost of the optical card can be reduced, and it is also possible to cope with defects which may occur after the optical card was shipped.

BRIEF DESCRIPTION OF THE DRAWINGS

FIG. 1 is a circuit block diagram of an apparatus for playing back recorded information from an optical card according to an embodiment of the present invention;

FIGS. 2a to 2c and 3a to 3h are time charts each showing an output waveform of the circuit shown in FIG. 1;

FIGS. 7a to 7c are time charts showing the circuit operation in FIG. 6;

FIGS. 9a to 9c are time charts showing the operation of the circuit in FIG. 8;

FIGS. 12 to 17c show a conventional example;

FIG. 12 shows a projection light optical system for reproducing recorded information;

FIG. 13 is a plan view of an optical card showing enlargedly an information recording portion;

FIGS. 14a to 14c and 15a to 15c are explanatory diagrams showing the correspondence relations among the pit train, photo sensing signal and its binarization signal; and FIGS. 16a to 16c and 17a to 17c are explanatory diagrams showing a photo sensing signal and its binarization signal in a state in which a fouling is deposited.

DETAILED DESCRIPTION OF PREFERRED EMBODIMENTS

Figure 4:
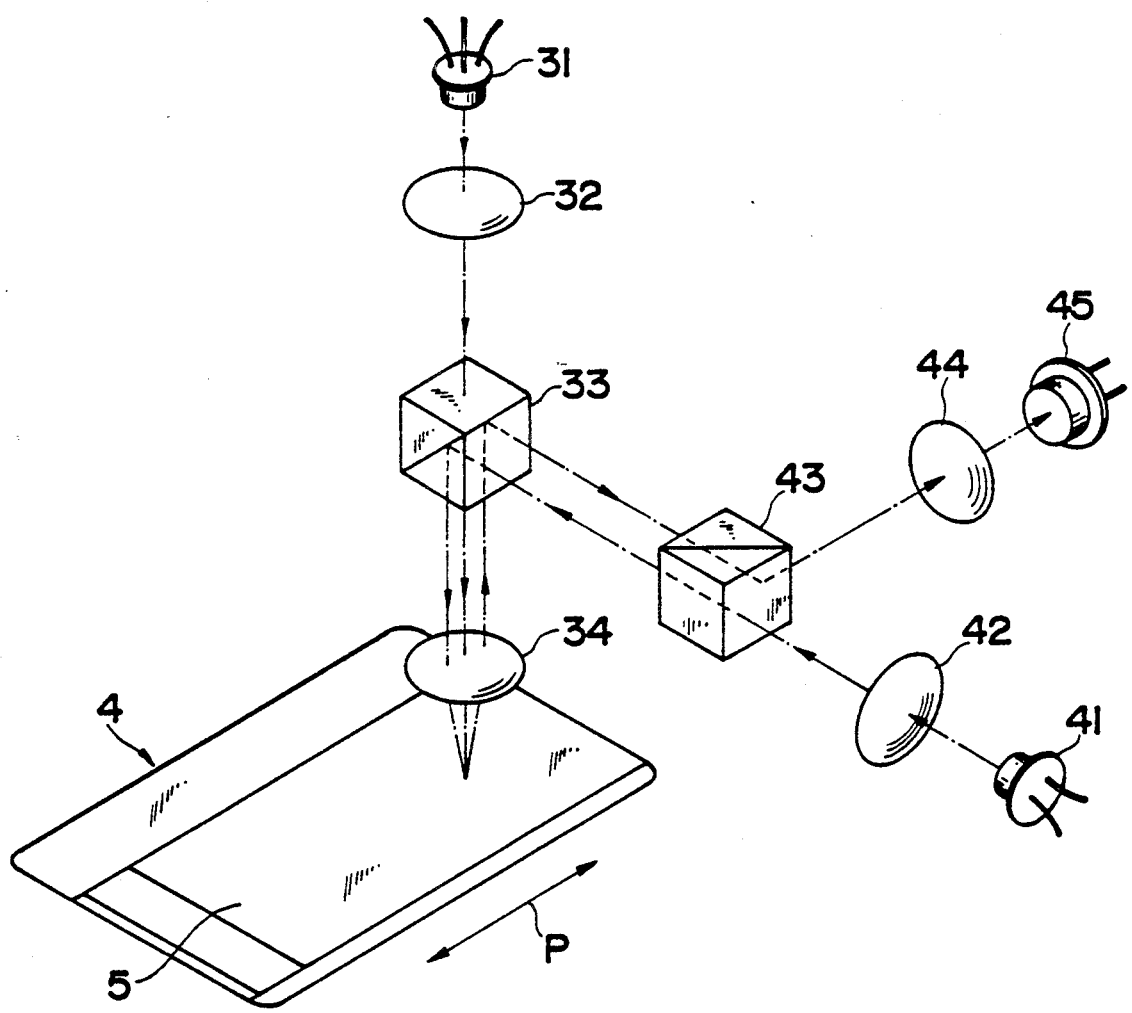
FIG. 4 is a perspective view showing an arrangement of an optical system of an optical head in another embodiment of the invention.

FIG. 1 shows an example of a circuit arrangement of an apparatus for playing back recorded information from an optical card according to an embodiment of the present invention. This apparatus comprises: a photo detector 21; an amplifier 22; a low pass filter 23; a peak detector 24; a frequency/voltage converter 25; a comparator 26; and a latch circuit 27.

Figure 12:
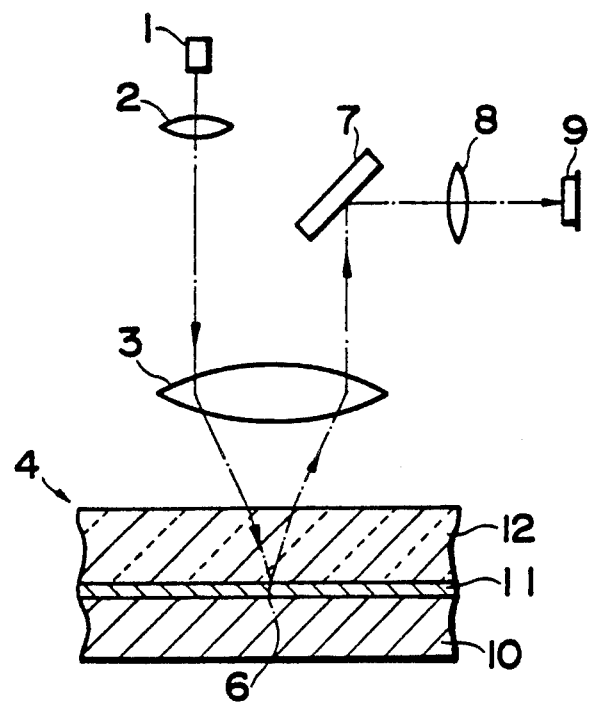
Figure 13A:
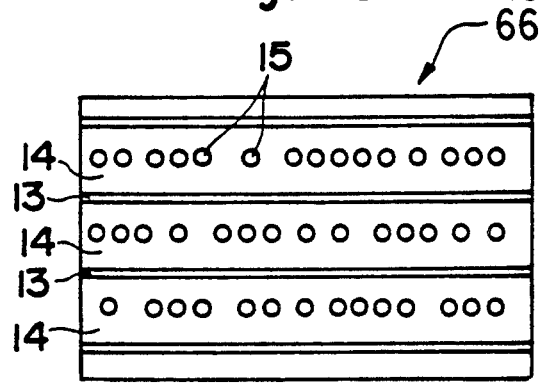
Figure 13B:
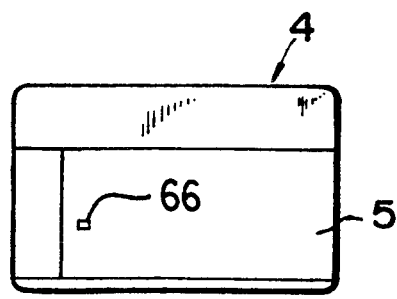

The photo detector 21 comprises a photo diode or the like. When a light beam for reproducing recorded information is irradiated onto an optical card 4 by a light projection optical system as shown in FIG. 12, the photo detector 21 receives the reflected light from the optical card 4 and photoelectrically converts it into the electric signal and outputs a photo sensing signal a which changes in accordance with an amount of light received. The photo detector 21 corresponds to the photo detector 9 in FIG. 12. The amplifier 22 amplifies the photo sensing signal a and outputs an amplified signal b. The low pass filter 23 removes the high-frequency noise components from the amplified output b from the amplifier 22 and outputs a signal c.

The peak detector 24 differentiates the photo sensing amplified signal c from which the noise components were removed and obtains a zero-cross signal $c_1$, which will be explained hereinafter. The peak detector 24 detects the peak position of the signal c on the basis of the zero-cross position of the zero-cross signal $c_1$, thereby producing a pit correspondence signal d which rises in correspondence to each pit position.

The frequency/voltage converter 25 converts the frequency of the pit correspondence signal d into the voltage. A voltage output e is given to one input terminal of the comparator 26. The comparator 26 compares the voltage output e with a reference voltage $V_{REF}$ and outputs a signal which rises when they coincide An output of the comparator 26 is latched by the latch circuit 27. An information presence/absence discrimination signal g indicative of the presence or absence of recorded information is produced.

FIG. 2a shows an example of the pit correspondence signal d which is output from the peak detector 24. FIG. 2b shows the voltage output e of the f-v converter 25 corresponding to the pit correspondence signal d. FIG. 2c shows the information presence/absence discrimination signal g which is output from the latch circuit 27. In these diagrams, the portions indicated by symbols A and B denote pit correspondence signals generated due to a defect such as fouling, scratch or the like on the optical card. The level of the voltage output e of the f-v converter 25 corresponding to this portion is lower than that of the reference voltage $V_{REF}$ of the comparator 26. Therefore, the information presence/absence discrimination signal g is at the "0" level and "no recorded information exists" is properly determined. On the other hand, the portion indicated by reference character C relates to the pit correspondence signal corresponding to the information train of the optical card. The level of the voltage output e of the f-v converter 25 corresponding to this portion is higher than that of the reference voltage $V_{REF}$ of the comparator 26, so that the information presence/absence discrimination signal q is set to the "1" level.

FIGS. 3a to 3h show the relation between the recorded information represented by the pit train on the optical card and the output waveform in each section of the circuit shown in FIG. 1. The practical examples shown in these diagrams correspond to the portions shown by reference character D in FIGS. 2a to 2c.

FIG. 3a shows information consisting of "1" and "0". FIG. 3b shows a state in which the information of FIG. 3a is expressed as a train of the pits 15. The example shown in the diagrams relates to the case where the information is expressed by the MFM modulation recording system for modulating the information by the pit interval. When the information is shifted from "0" to "0", the pit 15 is formed at the intermediate position between them. On the other hand, when the information is shifted from "0" to "1", from "1" to "0", or from "1" to "1", the pit 15 is formed at the position of "1", respectively.

FIG. 3c shows the photo sensing signal a generated by the photo detector 21 or the amplified output b by the amplifier 22. FIG. 3d shows the zero-cross signal $c_1$ produced by the differentiation of the signal $c_1$. The zero-cross position of the zero-cross signal $c_1$ corresponds to the peak position (positive and negative peaks) of the photo sensing signal a. A binarization signal $c_2$ shown in FIG. 3e rises when the zero-cross signal $c_1$ crosses the zero point from a negative value to a positive value and trails when the signal $c_1$ crosses the zero point from a positive value to a negative value.

FIG. 3f shows the pit correspondence signal d which is output from the peak detector 24. The pit correspondence signal d rises at the timing of the leading edge of the binarization signal $c_2$. This leading timing corresponds to the central position of the pit 15.

FIG. 3g shows the frequency/voltage conversion output e of the pit correspondence signal d and corresponds to the voltage output of the f-v converter 25. By comparing the voltage output e with the reference voltage $V_{REF}$, the information presence/absence discrimination signal g shown in FIG. 3h is derived.

In the foregoing practical examples, it is now presumed the case where the fouling Q was deposited on the pit train as shown in FIG. 3b. When a light beam for recording/reproducing is irradiated onto the portion where the fouling Q was deposited, an amount of reflected light from the optical card decreases than that in the case where no fouling is deposited. However, a reflectance of the portion where the fouling Q was deposited does not always coincide with a reflectance of the portion of the pits 15. Therefore, a negative peak appears in the photo sensing signal a derived by the photo detector 21 in correspondence to the position of the pit 15 (refer to FIG. 3c). Therefore, as the pit correspondence signal d which is output by the pea detector 24, the same signal as that in the case where no fouling Q is deposited is obtained as shown in FIG. 3f. Thus, the presence or absence of recorded information can be properly determined by the information presence/absence discrimination signal g.

As mentioned above, according to the present invention, the peak of the photo sensing signal from the photo detecting means is detected, a pit correspondence signal is produced from the result of the peak detection, and the frequency of the pit correspondence signal is converted into the voltage. Thereafter, the conversion voltage output is compared with a reference value and an information presence/absence discrimination signal is produced. Therefore, if a fouling or the like exists in a portion having no recorded information, the frequency/voltage conversion output does not reach the reference value and the information presence/absence discrimination signal is turned off (namely, it is set to the "0" level). Thus, "no recorded information exists" is properly decided. On the other hand, even if a fouling or the like exists in the portion having recorded information, the peak appears on the photo sensing signal in correspondence to the pit position, so that the information presence/absence discrimination signal is turned on (i.e., it is set to the "1" level). Thus, "the recorded information exists" is properly determined.

Accordingly, prior to recording information onto the information recording track, the presence or absence of recorded information on this information recording track can be certainly and accurately determined. Therefore, the occurrence of a defective recording of information can be prevented and the using efficiency of the information recording track can be improved.

FIGS. 4 to 11 show another embodiment of the invention.

FIG. 4 shows an optical system of an optical head which is assembled in an optical card recording/playing-back apparatus to which the invention is applied.

The apparatus shown as an example in the diagram comprises: a first optical system for irradiating a recording light onto an information recording track for recording of the optical card 4 and for writing information onto this track; and a second optical system for irradiating a reproducing light onto an information recording track for reproduction of the information recorded on the optical card 4 and for reading the recorded information from this track on the basis of the reflected light. The reflected light from the optical card 4 is led to a light receiving portion 45 through an optical path, which will be explained hereinlater.

The first optical system uses a laser diode 31 as a light source. A recording light which is emitted from the laser diode 31 is converted into a parallel light beam by a collimator lens 32. This parallel light beam passes through a polarization beam splitter 33 and is focused onto the information recording portion 5 of the optical card 4 by a condenser lens 34, thereby irradiating a light spot.

Figure 5A:
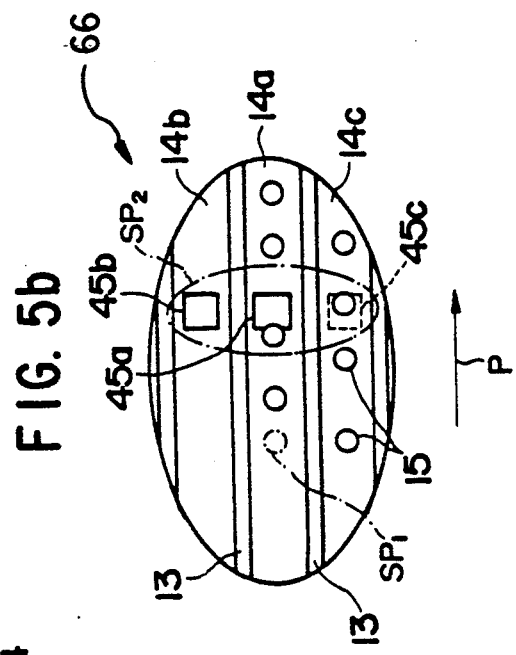
FIG. 5 is a plan view of an optical card showing enlargedly a light irradiating state onto an optical card.
Figure 5B:
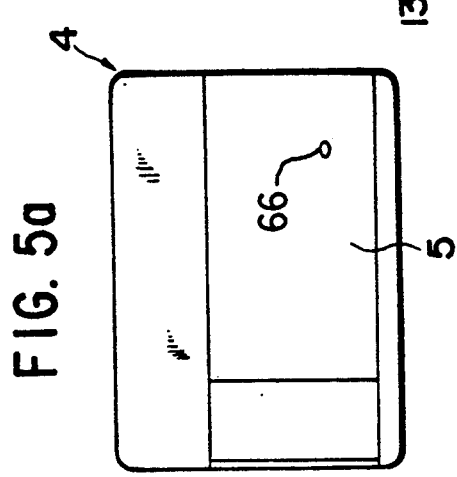

FIG. 5 shows a state in which a first light spot $SP_1$ having a diameter of about 1 μm is formed onto a predetermined information recording track 14a of the optical card 4 by the light irradiation. The light spot $SP_1$ causes a terminal irreversible change in the information recording portion 5, thereby forming a pit 15 whose light reflectance is lower than that of the other portion.

The second optical system uses a light emitting diode 41 as a light source. A reproducing light which is emitted from the light emitting diode 41 is converted into a parallel light beam by a collimator lens 42. This parallel light beam passes through a non-polarization beam splitter 43 and thereafter, it is led to the polarization beam splitter 33. The polarization beam splitter 33 leads the reproducing light from the light emitting diode 41 to the condenser lens 34 and projects this light onto the optical card 4 by the lens 34. The polarization beam splitter 33 also separates the reflected light of the reproducing light from the optical card 4 from the recording light. The reproducing light is focused onto the information recording portion 5 of the optical card 4 due to the operation of the condenser lens 34, so that a second light spot $SP_2$ having a diameter of about a few μm is formed as shown in FIG. 5. The second light spot $SP_2$ is formed at the position just before or just after the forming position of the first light spot $SP_1$ in the relative moving direction of the optical card 4. The second light spot $SP_2$ is irradiated into a range of three adjacent information recording tracks 14a, 14b and 14c including the track 14a to be recorded. In FIGS. 4 and 5, an arrow P represents a relative moving direction of the optical card 4 to an optical head.

Although the recording light from the light source 31 is irradiated like a pulse (intermittently) to only a position where the pit 15 is formed, the reproducing light from the light source 41 is the continuous light and scans the recording track in association with the relative movement of the optical card 4.

The reflected light from the optical card 4 by the light spot $SP_2$ passes through the condenser lens 34 and is deflected by the polarization beam splitter 33 and non-polarization beam splitter 43. Thereafter, it is led through a condenser lens 44 to the light receiving portion 45 and an image of the second light spot $SP_2$ is formed on the light receiving portion 45. The light receiving portion 45 in this embodiment includes at least three photo diodes. These photo diodes individually simultaneously detect the reflected lights from the three information recording tracks 14a, 14b and 14c, thereby simultaneously reading the information from three tracks.

In FIG. 5, square portions 45a, 45b and 45c indicate detecting ranges of the reflected lights by the photo diodes. The sizes of these portions are larger than the pit 15 and these portions are positioned so as to correspond to the three information recording tracks 14a, 14b and 14c, respectively.

A defect discriminating section is connected to the light receiving portion 45. While information is being recorded onto a certain information recording track 14a, the presence or absence of a defect on the information recording track 14b onto which information is subsequently recorded is discriminated by the defect discriminating section.

Figure 6:
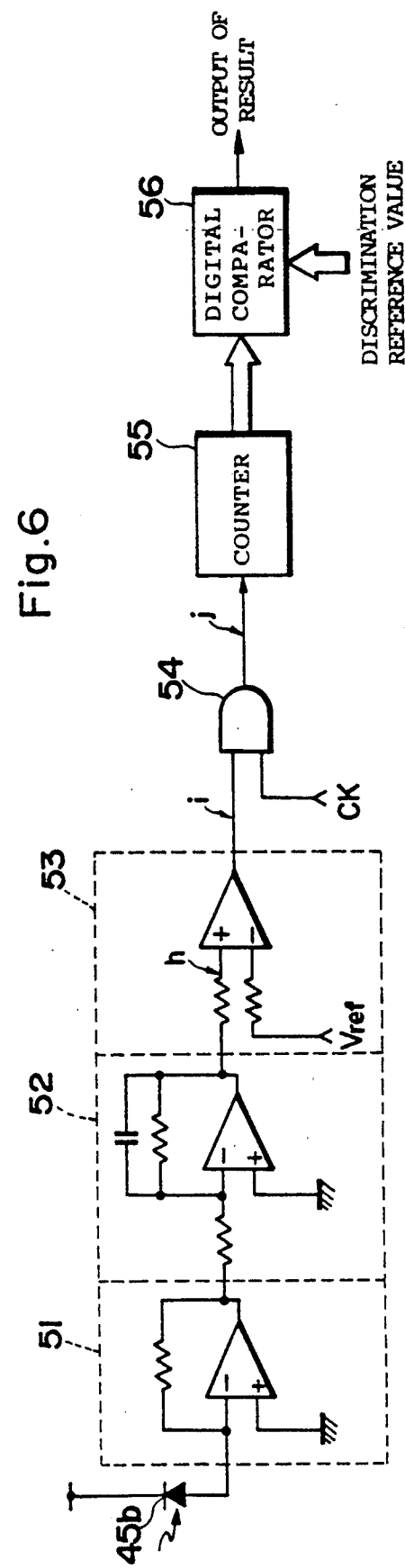
FIG. 6 is an electric circuit diagram showing an example of a circuit arrangement of a defect discriminating section.

FIG. 6 shows an example of a practical circuit arrangement of the defect discriminating section. FIGS. 7a to 7c are time charts for this circuit. The defect discriminating section is electrically connected to the photo diode (this is also indicated at reference numeral 45b) to detect the reflected light in the portion 45b in FIG. 5 among the three photo diodes constructing the light receiving portion 45.

The defect discriminating section as an example shown in Pig. 6 comprises: a current/voltage converter 51; a low pass filter 52; an analog comparator 53; an AND circuit 45; a counter 55; and a digital comparator 56. A current output obtained by being photoelectrically converted by the photo diode 45b is converted into a voltage by the current/voltage converter 51. This voltage is input to the analog comparator 53 through the low pass filter 52. The analog comparator 53 compares a level (FIG. 7a) of an input voltage signal h with a reference voltage level $V_{ref}$ and outputs a detection signal i (FIG. 7b) when the input voltage level decreases to the reference voltage level $V_{ref}$ or less due to the existence of a defect.

The AND circuit 54 allows a clock pulse CK to pass in response to the detection signal i and outputs a signal j (FIG. 7c) including the clock pulses CK as many as the number which is proportional to the pulse width of the detection signal i. The signal j is given to the counter 55. The counter 55 counts the number of clocks and outputs a count value to the digital comparator 56. The digital comparator 56 compares the count value with a discrimination reference value. When the count value exceeds this reference value, the digital comparator 56 decides the existence of a defect and outputs the result of the discrimination. As the count value which is compared with the discrimination reference value, it is possible to use a value on one recording track or a value of a predetermined length in one track or a value on a plurality of tracks. In other words, the counter 55 is reset, for example, each time one track of the optical card is scanned by the optical system. The optical card which is determined to have a defect is properly processed in accordance with a degree of the defect or the like. For instance, if there are many defects and they exist on a plurality of tracks, this optical card is rejected as an unrecordable card. If only one defect exists or defects exist on only a few tracks, information is recorded onto only the normal tracks excluding those defective tracks.

Figure 8:
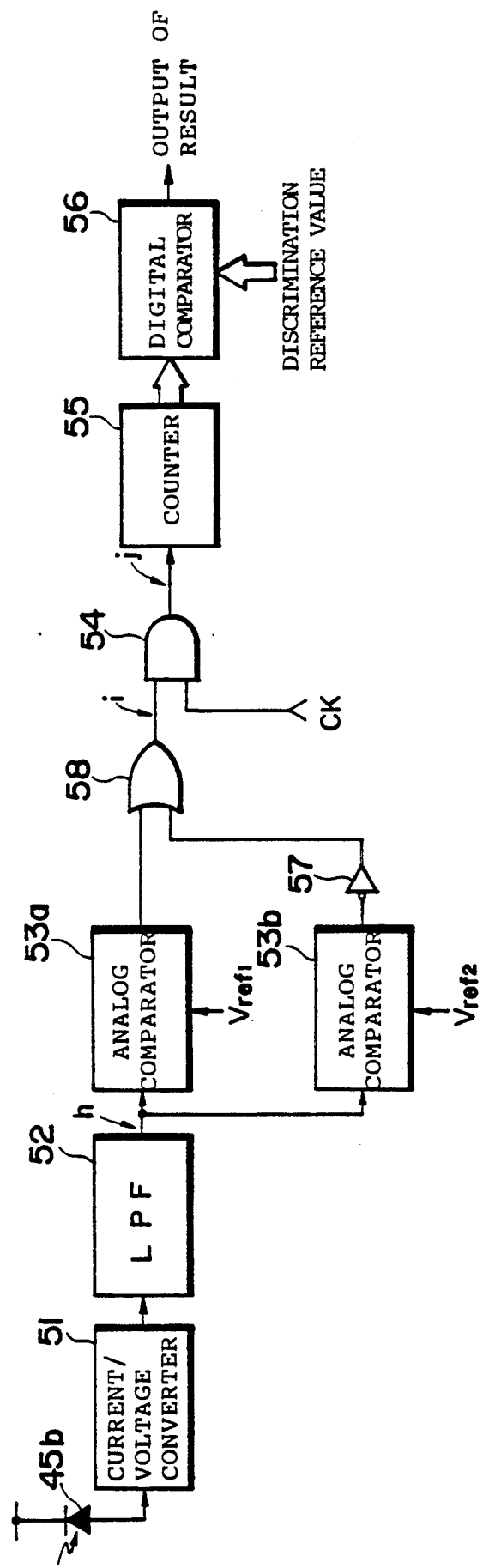
FIG. 8 is a circuit block diagram showing another embodiment of a defect discriminating section.

FIG. 8 shows a circuit arrangement of another embodiment of a defect discriminating section. FIGS. 9a to 9c show time charts for this circuit.

The circuit of FIG. 8 has a pair of analog comparators 53a and 53b. The analog comparator 53a outputs a detection signal when the level of the input voltage signal h decreases to a first reference level $V_{ref1}$ or less due to the existence of a defect The other analog comparator 53b outputs a detection signal through an inverter 57 when the level of the input voltage signal h rises to a second reference level $V_{ref2}$ or more due to the existence of a defect. These detection signals are input to an OR circuit 58. An output signal of the OR circuit 58 is given as the detection signal i to the AND circuit 54, by which the signal j including the clock pulses CK as many as the number which is proportional to the pulse width of the detection signal i is produced. The other arrangement is similar to that shown in FIG. 6. The same or similar parts and components as those in FIG. 6 are designated by the same reference numerals and their descriptions are omitted here.

Figure 10A:
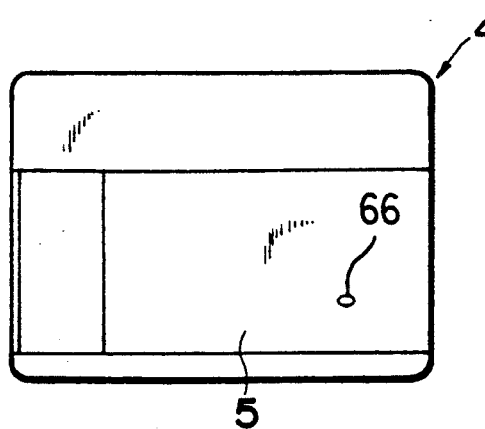
FIGS. 10 and 11 are plan views of optical cards each showing enlargedly a light irradiating state onto the optical card in other embodiments of the invention.
Figure 10B:
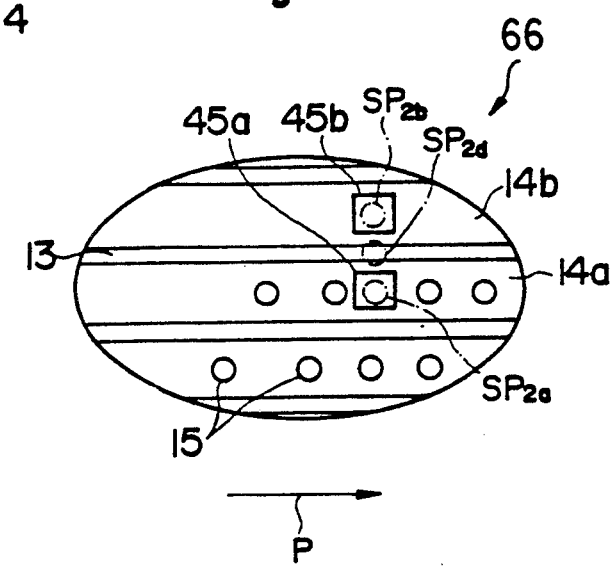

FIG. 10 relates to an embodiment in which a laser diode is used as a light source (corresponding to the light emitting diode 41 in FIG. 4) of the second optical system. FIG. 10 shows a state in which second light spots $SP_{2a}$, $SP_{2b}$ and $SP_{2d}$ each having the almost same diameter as the pit 15 are individually formed on a plurality of information recording tracks 14a and 14b and on the intermediate track guide 13 between these tracks by using a diffraction grating. In the diagram, the square portions 45a and 45b indicate the detecting ranges of the reflected lights of the light spots $SP_{2a}$ and $SP_{2b}$ by the photo diodes of the light receiving portion 45. Each size of the portions 45a and 45b is larger than the pit 15. These portions are positioned so as to correspond to the two information recording tracks 14a and 14b. The light spot $SP_{2d}$ is used for tracking.

Figure 11A:
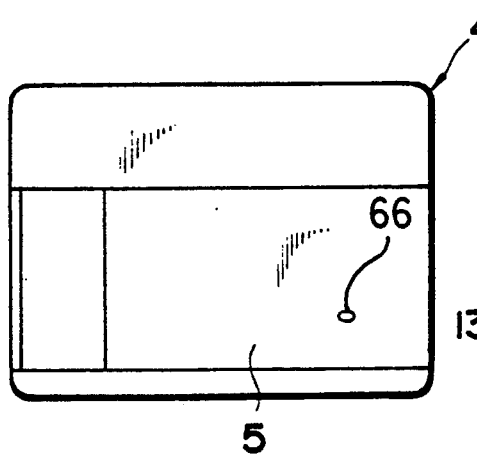
Figure 11B:
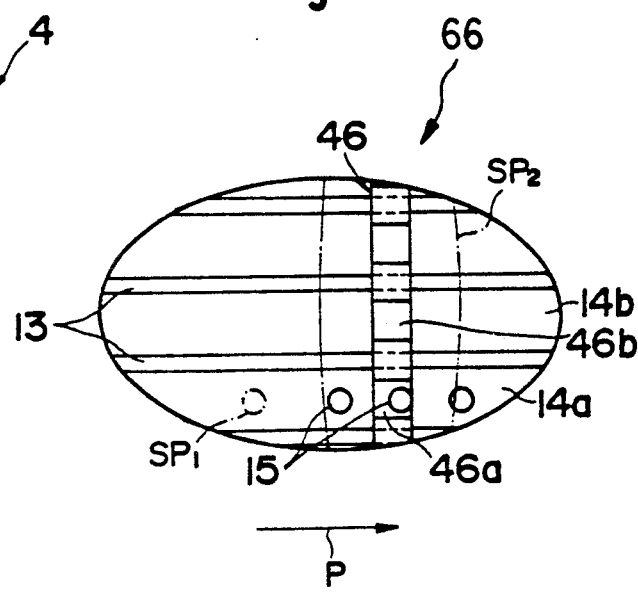

FIG. 11 relates to an embodiment in which a light emitting diode is used as a light source of the second optical system and a CCD 46 comprising a plurality of pixels is used as the light receiving portion 45. FIG. 11 shows a state in which the first light spot $SP_1$ is formed on a predetermined information recording track 14a of the optical card 4 and the second light spot $SP_2$ of a large diameter is formed at the position just before or just after the first light spot $SP_1$. In FIG. 11, the square portion indicates a detecting range of the reflected light of the light spot $SP_2$ by each pixel (photo sensing element) of the CCD 46. Among these pixels, a pixel 46a is positioned so as to correspond to the information recording track 14a onto which information is being written. A pixel 46b is positioned so as to correspond to the information recording track 14b to be written next.

A recording light is irradiated like a pulse onto a predetermined information recording track 14a of the optical card 4 by the first optical system and the first light spot $SP_1$ is formed, thereby writing information. A continuous reproducing light is irradiated onto the optical card 4 by the second optical system, thereby forming the second light spot $SP_2$ at the position just before or just after the first light spot $SP_1$ so as to cover the information recording tracks 14a, 14b, 14c and the like. The reflected light from the optical card 4 by the second light spot $SP_2$ is led to the light receiving portion 45 by the second optical system. The photo sensing signal of the photo diode with respect to the information recording track 14b onto which information is next written is given to the defect discriminating section. Thus, on the basis of this photo sensing signal, the defect discriminating section discriminates whether defects such as scratches or the like exist on the information recording track 14b or not and outputs the result of the discrimination. The track to check the presence or absence of defects is not limited to one track onto which information is next written. The presence or absence of defects can be also checked all together with regard to a plurality of tracks.

As mentioned above, according to the invention, while information is being written onto a certain information recording track, the presence or absence of defects is checked with regard to the information recording track onto which information is to be written after that. Therefore, the load for the checking operation upon manufacturing of the optical card can be lightened. The manufacturing cost of the optical card can be reduced. It is also possible to cope with the defects which may occur after the optical card was shipped.

What is claimed is:

1. An apparatus for playing back recorded information from an optical card in which by irradiating a light beam for reproducing recorded information onto information recording tracks of the optical card on which pit trains indicative of recording information are formed the pit trains are read on the basis of the difference between a reflectance of the pit portions and reflectance of the other portion and the recorded information on the optical card is reproduced, said apparatus comprising:

a photodetector for receiving reflected light from the optical card and for outputting a photosensing signal;

means for detecting a peak of the photosensing signal and for producing a pit correspondence signal having a frequency indicative of peak detection;

a frequency to voltage converter for converting the frequency of the pit correspondence signal into a voltage signal; and means for producing an information presence/absence discrimination signal whenever the voltage signal from the frequency to voltage converter exceeds a predetermined value.

2. An apparatus according to claim 1, wherein the photodetector is a photo diode.

3. An apparatus according to claim 1, wherein the peak detecting means comprises:

means for differentiating the photosensing signal; and means for using a zero-cross position of the differentiated signal as the peak.

4. An apparatus according to claim 1, further comprising means for discriminating between the presence or absence of information when recording the information.

5. An apparatus according to claim 4, wherein the discrimination means comprises:

a first optical system for writing information onto the optical card; and a second optical system for reading the recorded information using reflected light, wherein the second optical system further comprises a light receiving portion which can individually receive the reflected light from a plurality of information recording tracks, a defect discriminating section connected to said light receiving section, and means for detecting defects when information is recorded onto one of the information tracks based on the photosensing signal.

6. An apparatus for discriminating the presence or absence of recorded information on an optical card, comprising:

an optical system for irradiating a light beam for reproducing recorded information onto an information recording tracks of an optical card on which pit trans indicative of recording information are formed;

photo detecting means for receiving a reflected light from the optical card and outputting a photo sensing signal;

means for differentiating the photosensing signal to form a zero-cross signal;

means for detecting a peak of the photo sensing signal on the basis of the zero-cross position of the zero-cross signal;

means for producing a pit correspondence signal which changes with a pit position based on the peak detection; and means for generating an information presence/absence discrimination signal on the basis of the pit correspondence signal.

7. An apparatus according to claim 6, wherein said second optical system has said means for irradiating individual spot lights onto a plurality information recording tracks including said second track, and said light receiving means has a plurality of photo diodes to individually receive the reflected light from said plurality of information recording tracks, respectively.

8. An apparatus for recording information onto an information recording track of an optical card having a plurality of information recording tracks by optically scanning the track comprising:

a first optical system for irradiating light representing information to be recorded onto a first information recording track of the optical card to write the information onto said first track, a second optical system having means for irradiating light onto a second information recording track onto which information is to be recorded next to the first track and means for receiving light reflected from said second track, means, electrically connected to said light receiving means, for determining the presence or absence of defects on said second track on the basis of the photo sensing signal output from said light receiving means.

9. An apparatus according to claim 8, wherein said first optical system uses a laser diode as a light source.

10. An apparatus according to claim 8, wherein said defect determining section comprises:

an analog comparator for comparing an output signal level of said light receiving portion with a reference level and producing a detection signal;

a counter for measuring a pulse width of a detection signal which is output from said analog comparator; and a digital comparator for comparing a count value of said counter with a discrimination reference value and outputting the result of this comparison.

11. An apparatus according to claim 8, wherein said second optical system serves as an optical system for reading recorded information from an information recording track of the optical card.

12. An apparatus according to claim 11, wherein said second optical system has said means for irradiating a single spot light onto a plurality information recording tracks including said second track, and said light receiving means has a plurality of photo diodes to individually receive the reflected light from said plurality of information recording tracks, respectively.

13. An apparatus according to claim 11, wherein said second optical system has said means for irradiating a single spot light onto a plurality information recording tracks including said second track, and said light receiving means comprises a CCD having a plurality of pixels to individually receive the reflected light from the plurality of information recording tracks, respectively.

14. A method of determining the presence or absence of defects on an information recording track of an optical card having a plurality of tracks with use of an optical card recording/playing back apparatus comprising a first optical system for irradiating light representing information to be recorded onto an information recording track of the optical card and for writing information onto this track, and a second optical system for irradiating light onto an information recording track to be reproduced of the optical card and for reading recorded information from this track on the basis of the reflected light, said method comprising the steps of:

driving said first optical system so as to irradiating light representing information to be recorded onto a first information recording track of the optical card to write the information onto said first track, driving said second optical system so as to irradiate light onto a second information recording track onto which information is to be recorded next to the first track and to receive light reflected from said second track, and detecting a defect on said second track based on the photo sensing signal obtained by said second optical system.

* * * * *